US012094665B2

(12) United States Patent
Ohara

(10) Patent No.: US 12,094,665 B2
(45) Date of Patent: Sep. 17, 2024

(54) PUSH SWITCH

(71) Applicant: ALPS ALPINE CO., LTD., Tokyo (JP)

(72) Inventor: Hiroshi Ohara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 161 days.

(21) Appl. No.: 17/817,755

(22) Filed: Aug. 5, 2022

(65) Prior Publication Data

US 2022/0375700 A1 Nov. 24, 2022

Related U.S. Application Data

(63) Continuation of application No. PCT/JP2021/000463, filed on Jan. 8, 2021.

(30) Foreign Application Priority Data

Feb. 17, 2020 (JP) ................................ 2020-024567

(51) Int. Cl.
*H01H 13/14* (2006.01)
*H01H 13/04* (2006.01)
*H01H 13/20* (2006.01)

(52) U.S. Cl.
CPC ............ *H01H 13/14* (2013.01); *H01H 13/04* (2013.01); *H01H 13/20* (2013.01)

(58) Field of Classification Search
CPC ........ H01H 13/14; H01H 13/04; H01H 13/20; H01H 2203/038; H01H 2205/03; H01H 2215/018; H01H 2221/016; H01H 2221/05; H01H 13/48
See application file for complete search history.

(56) References Cited

U.S. PATENT DOCUMENTS

2008/0128255 A1* 6/2008 Villain .................. H05K 3/303 200/520
2023/0086523 A1* 3/2023 Ohara .................... H01H 13/14 200/341
2024/0096566 A1* 3/2024 Saito ....................... H01H 1/58

FOREIGN PATENT DOCUMENTS

JP H02-077825 U 6/1990
JP 2006-236805 9/2006
(Continued)

OTHER PUBLICATIONS

International Search Report for PCT/JP2021/000463 mailed on Mar. 9, 2021.

*Primary Examiner* — Lheiren Mae A Caroc
(74) *Attorney, Agent, or Firm* — IPUSA, PLLC

(57) ABSTRACT

A push switch includes a housing including a bottom wall and a side wall, the housing extending in a first axis direction and a second axis direction in a plan view, and a fixed contact member configured to come into contact with a movable contact member, the fixed contact member being embedded in the bottom wall of the housing by insert molding, wherein the fixed contact member includes: a first terminal exposed to an outside from a first end portion in the first axis direction of the housing; and first extension portions, constituting a pair, that are both ends of the first terminal in the second axis direction, the first extension portions being bent upward and being embedded in the bottom wall or the side wall of the housing, or in both the bottom wall and the side wall of the housing, by the insert molding.

9 Claims, 14 Drawing Sheets

(56) References Cited

FOREIGN PATENT DOCUMENTS

| | | |
|---|---|---|
| JP | 2015-008084 | 1/2015 |
| JP | 2019-061747 | 4/2019 |

* cited by examiner

PUSH SWITCH

CROSS-REFERENCE TO RELATED APPLICATIONS

This application is a continuation of International Application No. PCT/JP2021/000463, filed on Jan. 8, 2021, and designating the U.S., which claims priority to Japanese Patent Application No. 2020-024567 filed on Feb. 17, 2020. The contents of the foregoing applications are incorporated herein by reference in their entirety.

BACKGROUND OF THE INVENTION

1. Field of the Invention

The present disclosure herein relates to a push switch.

2. Description of the Related Art

Conventionally, there is a switch that includes: a fixed contact member embedded in a bottom wall of a resin housing, having a longer-side direction and a shorter-side direction, by insert molding; and a movable contact member provided in a compartment of the housing. The fixed contact member has terminals provided at the end portions in the longer-side direction, and bent portions that are bent upward toward the center in the longitudinal direction are provided on both sides, in the shorter-side direction, of each of the terminals. The bent portions are embedded in the wall part of the housing by insert molding (for example, see Japanese Laid-Open Patent Publication No. 2019-061747).

SUMMARY OF THE INVENTION

According to an aspect of the present disclosure, a push switch includes a housing including a bottom wall and a side wall, the housing extending in a first axis direction and a second axis direction in a plan view, and a fixed contact member configured to come into contact with a movable contact member, the fixed contact member being embedded in the bottom wall of the housing by insert molding, wherein the fixed contact member includes: a first terminal exposed to an outside from a first end portion in the first axis direction of the housing; and first extension portions, constituting a pair, that are both ends of the first terminal in the second axis direction, the first extension portions being bent upward and being embedded in the bottom wall or the side wall of the housing, or in both the bottom wall and the side wall of the housing, by the insert molding.

BRIEF DESCRIPTION OF THE DRAWINGS

Other objects and further features of the present disclosure will be apparent from the following detailed description when read in conjunction with the accompanying drawings, in which.

DESCRIPTION OF THE EMBODIMENTS

In a conventional switch, bent portions are not provided at the corners of both ends of terminals, and therefore, there is a risk that the rigidity of the terminals will be insufficient when a force greater than expected is applied to the housing. Accordingly, it is desired to increase the rigidity.

Therefore, it is desired to provide a push switch with a high degree of rigidity.

In the following, a push switch according to embodiments of the present disclosure will be described with reference to the accompanying drawings.

First Embodiment

Figure 1:
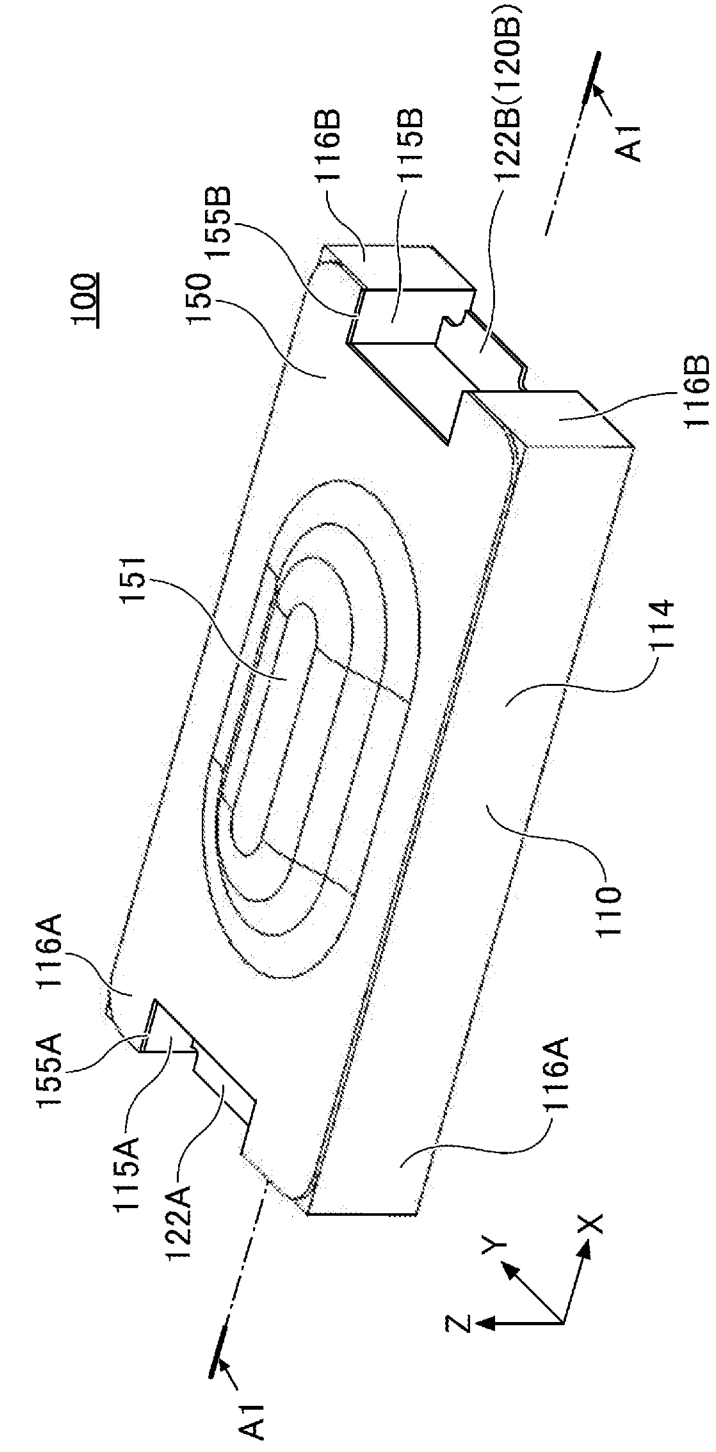
FIG. 1 is a perspective view of a push switch 100 according to a first embodiment.
Figure 2:
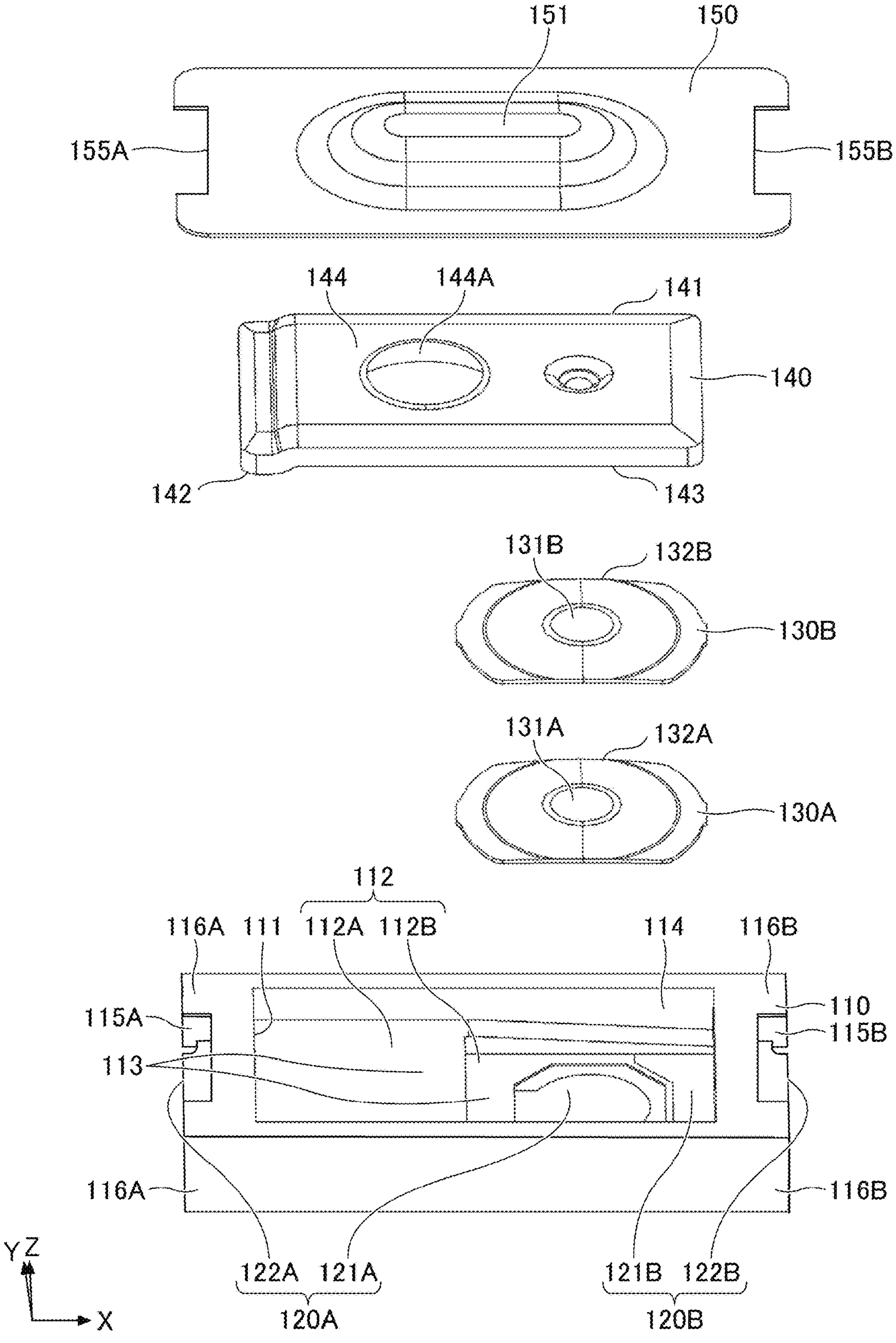
FIG. 2 is an exploded view of the push switch 100.

FIG. 1 is a perspective view of a push switch 100 according to a first embodiment. FIG. 2 is an exploded view of the push switch 100. In the following, an XYZ Cartesian coordinate system is used for description. Further, for convenience of description, −Z side is referred to as a lower side or a lower part, and +Z side is referred to as an upper side or an upper part, but this positional relationship does not represent a universal relationship.

The push switch 100 includes a housing 110, metal plates 120A and 120B, a metal contact 130A, a leaf spring 130B, a pressing member 140, and an insulator 150.

Figure 3:
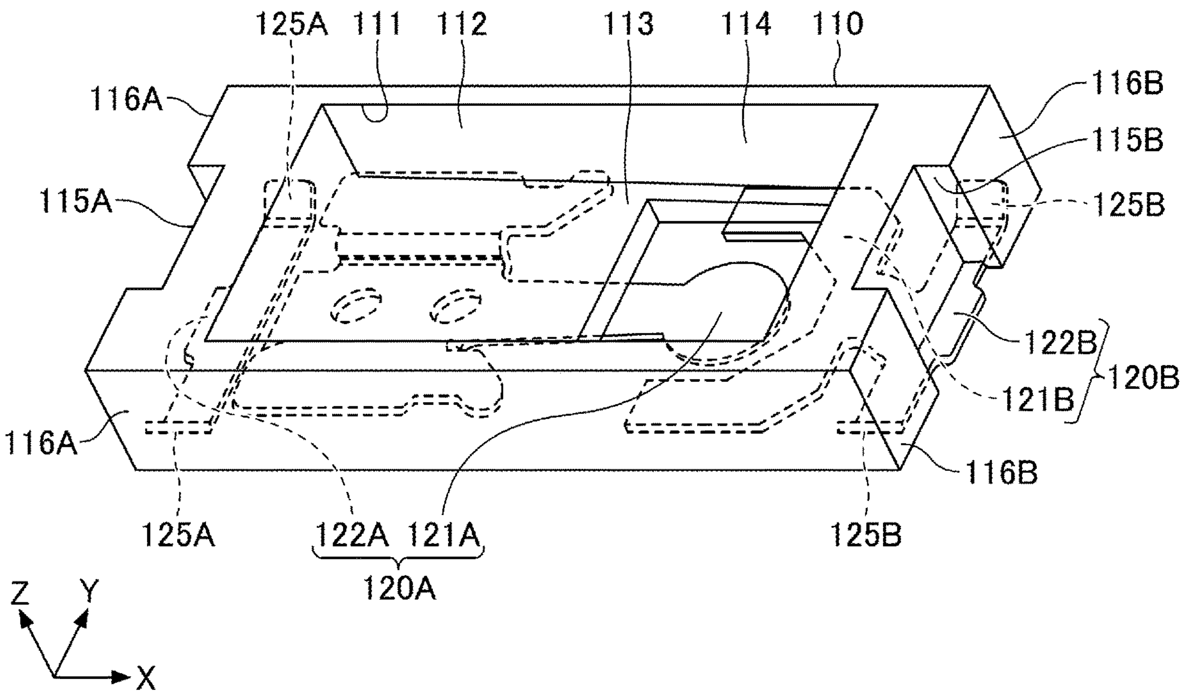
FIG. 3 is a drawing that transparently illustrates metal plates 120A and 120B embedded in the housing 110 by insert molding.
Figure 4:
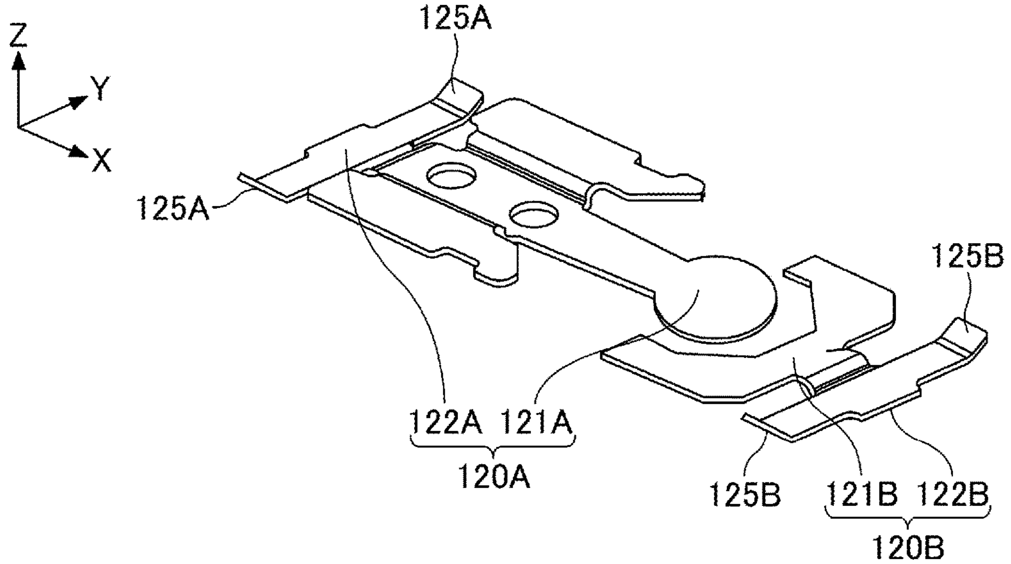
FIG. 4 is a drawing illustrating the metal plates 120A and 120B.
Figure 5:
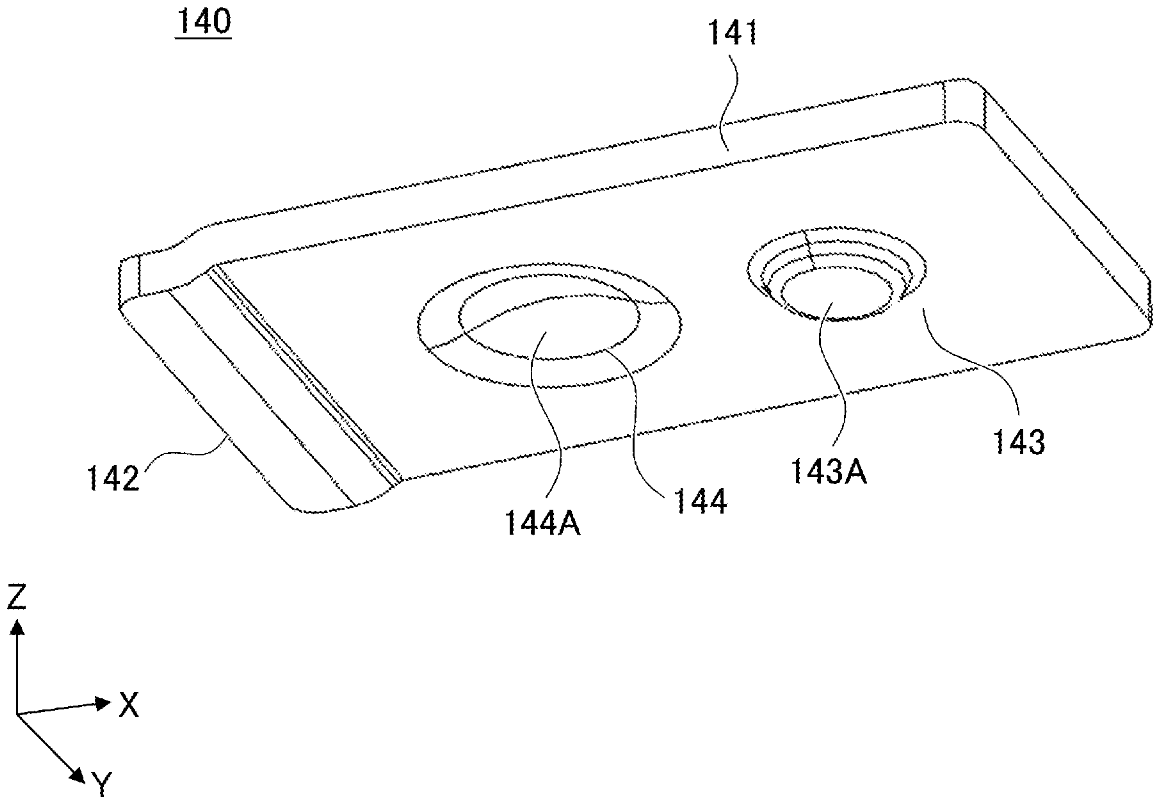
FIG. 5 is a drawing illustrating the back side of a pressing member 140.
Figure 6:
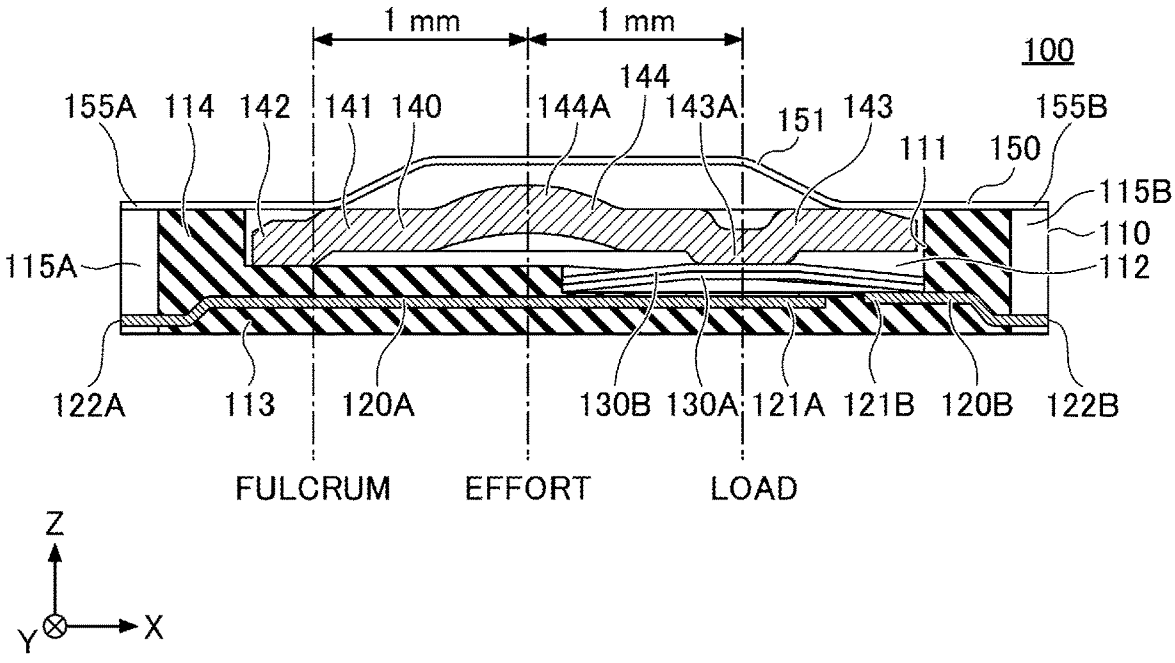
FIG. 6 is a cross-sectional view taken along A1-A1 of FIG. 1.
Figure 7:
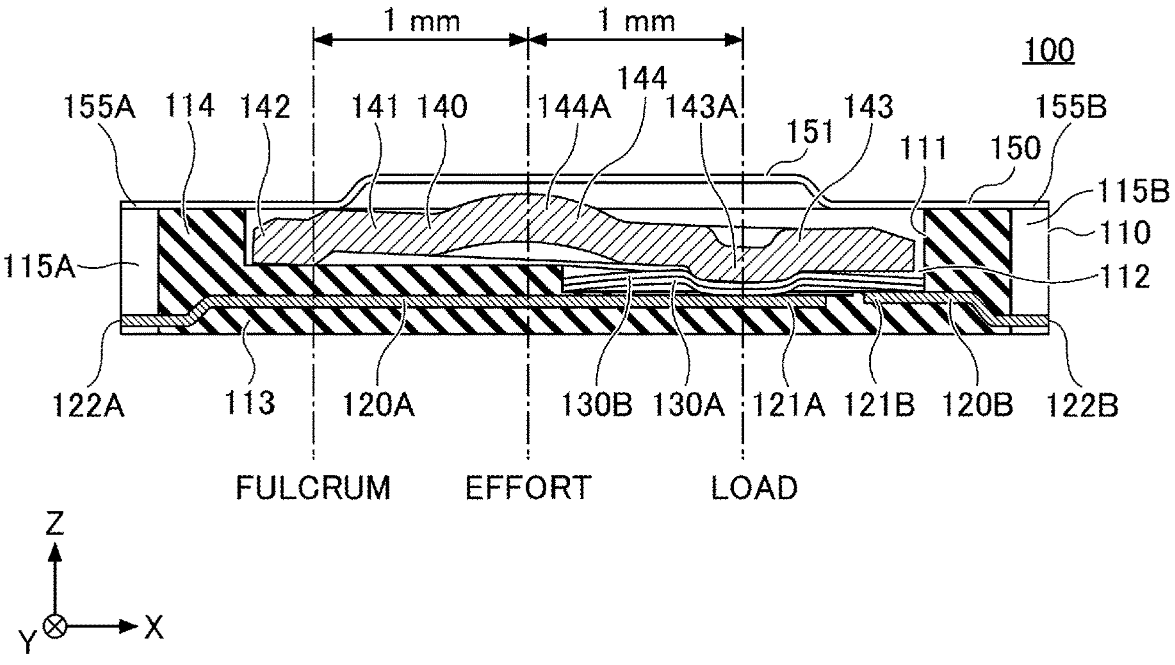
FIG. 7 is a cross-sectional view taken along B1-B1 of FIG. 1.

Hereinafter, the metal plates 120A, 120B are explained with reference to not only FIG. 1 and FIG. 2 but also FIG. 3 and FIG. 4. FIG. 3 is a drawing that transparently illustrates the metal plates 120A, 120B embedded in the housing 110 by insert molding. FIG. 4 is a drawing illustrating the metal plates 120A, 120B. The pressing member 140 is explained with reference to not only FIG. 2 but also FIG. 5. FIG. 5 is a drawing illustrating the back side of the pressing member 140. The cross-sectional structure is explained with reference to FIG. 6 and FIG. 7 illustrating a cross-section taken along A1-A1 of FIG. 1. The cross-section taken along A1-A1 is a cross-section taken in a XZ plane at the center in the Y direction of the push switch 100.

The push switch 100 has, for example, a shape of which the length in the X direction is longer than the length in the Y direction. Accordingly, the housing 110, the pressing member 140, and the insulator 150 also have shapes of which the length in the X direction is longer than the length in the Y direction.

In the following explanation, with respect to the push switch 100, the housing 110, the pressing member 140, and the insulator 150, the X direction refers to a longer-side direction, and the Y direction refers to a shorter-side direction. The X direction is an example of a first axis direction, and the Y direction is an example of a second axis direction. Also, an end portion of the housing 110 in −X direction is an example of a first end portion in the first axis direction, and an end portion of the housing 110 in +X direction is an example of a second end portion in the first axis direction.

In the push switch 100, when the contact 130A is in an OFF state (in an electrically disconnected state), the metal contact 130A contacts the metal plate 120B (a peripheral fixed contact 121B), and does not contact the metal plate 120A (a central fixed contact 121A). That is, the metal plate 120A is not electrically connected to the metal plate 120B. Pressing the insulator 150 down causes the metal contact 130A to be pressed down through the pressing member 140 and the leaf spring 130B. As a result, the metal contact 130A becomes inverted and contacts the metal plate 120A, thus causing the metal plate 120A to be electrically connected to the metal plate 120B through the metal contact 130A, and in this state, the push switch 100 is on (in an electrically connected state). A stroke for pressing the insulator 150 in order to cause the metal contact 130A to contact the metal plate 120A is 0.05 mm, which is very short. Further, an operating load required to invert the metal contact 130A is 3.3 N, for example. This operating load is sufficient to prevent the push switch 100 from being turned on if the insulator 150 is accidentally touched. That is, this operating load is sufficient to reduce misoperation.

The housing 110 is made of resin, and holds the metal plates 120A and 120B. The housing 110 and the metal plates 120A and 120B are integrally formed by insert molding. In other words, the metal plates 120A, 120B are embedded in the housing 110 by insert molding. The housing 110 includes an opening 111 and a compartment 112 in communication with the opening 111. The opening 111 is formed in the surface on +Z side. The housing 110 includes a bottom wall 113 and a side wall 114. The bottom wall 113 is a plate-shaped portion provided on the bottom of the housing 110. The side wall 114 is a side wall extending upward from the four edges of the bottom wall 113. The space surrounded by the bottom wall 113 and the side wall 114 is the compartment 112.

The housing 110 includes recessed portions 115A, 115B on both ends in the X direction. The recessed portion 115A is an example of a first recessed portion, and is recessed in +X direction. The recessed portion 115B is an example of a second recessed portion, and is recessed in −X direction. The recessed portions 115A, 115B are recessed in the X direction by the same length, and the recessed portions 115A, 115B have the same length in the Y direction. The position of the recessed portions 115A, 115B in the Y direction are the same.

In the following explanation, of the bottom wall 113 and the side wall 114 of the housing 110, portions situated at four corners in a plan view are referred to as corner portions 116A, 116B. The corner portions 116A are situated on both ends in the Y direction at the end of the housing 110 on −X side. Portions of the corner portions 116A on −X side protrude toward −X side with reference to the recessed portion 115A. The corner portions 116B are situated on both ends in the Y direction at the end of the housing 110 on +X side. Portions of the corner portions 116B on +X side protrude toward +X side with reference to the recessed portion 115B.

The compartment 112 extends downward from the opening 111, and includes a compartment 112A on −X side and a compartment 112B on +X side. The compartment 112B is deeper than the compartment 112A, and the bottom wall 113 has a step between the compartment 112A and the compartment 112B.

The central fixed contact 121A of the metal plate 120A and the peripheral fixed contact 121B of the metal plate 120B are disposed at the bottom of the compartment 112B, and are exposed in the compartment 112B. The leaf spring 130B is stacked on the metal contact 130A, and the metal contact 130A and the leaf spring 130B are disposed above the central fixed contact 121A and the peripheral fixed contact 121B within the compartment 112B (see FIG. 6). The pressing member 140 is disposed on the leaf spring 130B, and is housed over the compartments 112A and 112B.

The bottom wall 113 is a portion at the bottom of the housing 110, and is a plate-shaped portion in a rectangular shape in a plan view. The bottom wall 113 has a step between the compartment 112A and the compartment 112B. The bottom wall 113 holds the metal plates 120A, 120B, so that the upper surfaces of the central fixed contact 121A of the metal plate 120A and the peripheral fixed contact 121B of the metal plate 120B are exposed.

The side wall 114 is provided along the four edges of the bottom wall 113, and extends upward from a portion of the bottom wall 113 that is outside the compartment 112. Extension portions 125A, 125B of the metal plates 120A, 120B are embedded in portions at four corners of the side wall 114 that are adjacent to the bottom wall 113.

The metal plate 120A includes the central fixed contact 121A, a terminal 122A, and the extension portions 125A. For example, the metal plate 120A may be made of copper. The central fixed contact 121A does not contact the metal contact 130A when the insulator 150 is not pressed down (see FIG. 6), and contacts the metal contact 130A when the insulator 150 is being pressed down (see FIG. 7). The terminal 122A protrudes to −X side within the recessed portion 115A of the housing 110.

The extension portions 125A are examples of first extension portions, constituting a pair, and are portions extending obliquely upward that are obtained by bending upward both ends in the Y direction of the terminal 122A extending in the Y direction. The extension portions 125A are embedded on lower sides, in a thickness direction, of the corner portions 116A of the housing 110. In the corner portions 116A, the extension portions 125A are provided to extend through the bottom wall 113 and the side wall 114.

The metal plate 120B includes the peripheral fixed contact 121B, a terminal 122B, and the extension portions 125B. For example, the metal plate 120B may be made of copper. The peripheral fixed contact 121B contacts the end portion on +X side of the metal contact 130A when the insulator 150 is not pressed down (see FIG. 6), and contacts the metal contact 130A also when the insulator 150 is being pressed down (see FIG. 7). The terminal 122B protrudes to +X side within the recessed portion 115A of the housing 110.

The extension portions 125B are examples of second extension portions, constituting a pair, and are portions extending obliquely upward that are obtained by bending upward both ends in the Y direction of the terminal 122B extending in the Y direction. The extension portions 125B are embedded on lower sides, in a thickness direction, of the corner portions 116B of the housing 110. In the corner portions 116B, the extension portions 125B are provided to extend through the bottom wall 113 and the side wall 114.

The extension portions 125A, 125B are provided to improve the rigidity of the entirety of the push switch 100 by reinforcing the corner portions 116A, 116B of the housing 110. The extension portion 125A and the terminal 122A are provided substantially along the entirety of the housing 110 in the Y direction, and have such a shape that both ends in the Y direction of the terminal 122A extending in the Y direction are bent upward. Likewise, the extension portion 125B and the terminal 122B are provided substantially over the entirety of the housing 110 in the Y direction, and have such a shape that both ends in the Y direction of the terminal 122B extending in the Y direction are bent upward. Therefore, the extension portions 125A, 125B are situated at four corners of the housing 110 in a plan view, and are situated on lower sides of the corner portions 116B in the thickness direction.

In this manner, the extension portions 125A, 125B having such a shape that both ends in the Y direction of the terminals 122A, 122B extending in the Y direction are bent upward, are embedded in the corner portions 116A, 116B of the housing 110, so that even if the housing 110 receives stress from the upper side, the rigidity of the housing 110 can be remarkably improved due to the presence of the extension portions 125A, 125B that are made of metal. In particular, the rigidity of the corner portions 116A, 116B of the housing 110 can be remarkably improved. Accordingly, the flexural rigidity of the push switch 100 that is bent in the longer-side direction can be remarkably improved.

This kind of reinforcement cannot be achieved by a conventional switch that includes extension portions extending toward +X side from both ends in the Y direction of the terminal 122A extending in the Y direction and extension portions extending toward −X side from both ends in the Y direction of the terminal 122B extending in the Y direction, because such a conventional switch does not have extension portions in the corner portions 116A, 116B of the housing 110. The conventional switch is suitable for an application in which strength is not so required, but for an application in an environment in which a higher strength is required, a configuration in which the extension portions 125A, 125B are embedded in the corner portions 116A, 116B of the housing 110 is effective.

In a configuration such as the conventional switch that includes extension portions extending toward +X side from both ends in the Y direction of the terminal 122A extending in the Y direction and extension portions extending toward −X side from both ends in the Y direction of the terminal 122B extending in the Y direction, the extension portions are bent toward the compartment 112, and therefore, the volume of the compartment 112 may decrease.

In contrast, in the push switch 100 according to the embodiment, the extension portions 125A, 125B are embedded in the corner portions 116A, 116B of the housing 110, and accordingly, the extension portions 125A, 125B are situated inside the bottom wall 113 and the side wall 114 in the corner portions 116A, 116B. Specifically, even when the extension portions 125A, 125B are provided the extension portions 125A, 125B do not affect the size of the compartment 112.

In a case where the pressing member 140 that utilizes the principle of leverage is included, an increase in the length in the X direction of the compartment 112 results in a larger ratio of the length between the fulcrum and the load to the length between the fulcrum and the effort in accordance with the principle of leverage. From this standpoint, it is effective to provide, in the corner portions 116A, 116B of the housing 110, the extension portions 125A, 125B having such a shape that both ends in the Y direction of the terminals 122A, 122B extending in the Y direction are bent upward.

Furthermore, the terminals 122A, 122B are accommodated in the recessed spaces of the recessed portions 115A, 115B of the housing 110, and therefore, the length of the push switch 100 in the X direction can be reduced.

Hereinafter, it is assumed that, in the corner portions 116A, 116B of the housing 110, each of the extension portions 125A, 125B is provided to extend through the bottom wall 113 and the side wall 114. However, in the corner portions 116A, 116B, the extension portions 125A, 125B may be provided in any one of the bottom wall 113 and the side wall 114. For example, in a case where the bottom wall 113 is relatively thick, the extension portions 125A, 125B may be provided only in the bottom wall 113. For example, in a case where the bottom wall 113 is relatively thin, the extension portions 125A, 125B may be provided only in the side wall 114 in the corner portions 116A, 116B. Specifically, in the corner portions 116A, 116B, the extension portions 125A, 125B may be provided in the bottom wall 113 or the side wall 114, or may be provided in both the bottom wall 113 and the side wall 114.

The metal contact 130A is a metal spring implemented with a metal member, and includes a dome 131A at the center thereof (see FIG. 2 and FIG. 4). The metal contact 130A protrudes upward in a dome shape and is invertible. The metal contact 130A is an example of a movable contact member. For example, the metal contact 130A may be made of stainless steel.

The dome 131A is inverted and projects downward upon being pressed from the top (see FIG. 7). In this state, the metal contact 130A contacts the central fixed contact 121A, thereby causing the central fixed contact 121A to be electrically connected to the peripheral fixed contact 121B. The lower surface of the metal contact 130A is silver-plated. This is because the lower surface of the metal contact 130A contacts the central fixed contact 121A and the peripheral fixed contact 121B through which the current flows. In addition, the inversion of the dome 131A can provide an operating sensation to an operator.

The metal contact 130A is made by punching a metal plate having a circular shape in a plan view to form the dome 131A, and cutting portions on +Y side and on −Y side of the metal plate along the X-axis. Therefore, the metal contact 130A includes cut portions 132A on +Y side and −Y side. The cut portions 132A are formed in order to reduce the size of the push switch 100 in the Y-axis direction.

The leaf spring 130B has the same configuration as that of the metal contact 130A, except that silver plating is not applied to the leaf spring 130B. The leaf spring 130B includes a dome 131B and cut portions 132B.

The pressing member 140 is housed over the compartments 112A and 112B of the compartment 112 (see FIG. 6). The pressing member 140 is an example of a first pressing member. The pressing member 140 is a metal member having a flat plate shape (see FIGS. 2, 3, and 4). The pressing member 140 includes a body portion 141, a fulcrum portion 142 (an example of a first fulcrum portion), a load portion 143 (an example of a first load portion), and an effort portion 144 (an example of a first effort portion). The pressing member 140 can function as a lever, and the fulcrum portion 142, the load portion 143, and the effort portion 144 function as the fulcrum, load, and effort of a lever. The pressing member 140 may be made by processing a metal plate. For example, the pressing member 140 may be made of stainless steel.

Because the pressing member 140 utilizes the principle of leverage, the pressing member 140 needs to have low deflection and relatively high stiffness. For this reason, the pressing member 140 is composed of metal, and is relatively wide in the Y-axis direction and relatively thick in the Z-axis direction.

The body portion 141 has a shape in which the fulcrum portion 142 and the load portion 143 are curved downward with respect to the effort portion 144 such that the load portion 143 can be easily moved downward.

The fulcrum portion 142 is disposed on −X side and contacts the bottom surface of the compartment 112A. The width in the Y-axis direction of the fulcrum portion 142 is sufficiently large. Therefore, the fulcrum portion 142 is not readily tilted in the Y-axis direction when the pressing member 140 is moved, thereby allowing a force to be efficiently transmitted to the leaf spring 130B and the metal contact 130A. In the present embodiment, the fulcrum portion 142 is disposed on the entire side in the Y-axis direction of the pressing member 140, but the fulcrum portion 142 may be divided into several portions.

The fulcrum portion 142 protrudes in −Z direction. Causing the fulcrum portion 142 to protrude in −Z side allows the pressing member 140 to be located away from the bottom surface of the compartment 112 in +Z side. Accordingly, the pressing member 140 can be readily moved.

The load portion 143 is disposed on +X side, and includes a projection 143A (an example of a first projection) configured to press the metal contact 130A. As illustrated in FIG. 5, the projection 143A has a truncated cone shape and a flat lower surface, and further, the projection 143A has a circular shape in a plan view.

The projection 143A is disposed in contact with the upper surface of the leaf spring 130B. The pressing member 140 utilizes the principle of leverage to cause the load portion 143 to be pressed down, thereby pressing the leaf spring 130B and the metal contact 130A down. As a result, the leaf spring 130B and the metal contact 130A are inverted, and the metal contact 130A contacts the central fixed contact 121A.

The effort portion 144 is disposed between the fulcrum portion 142 and the load portion 143, and includes a projection 144A. The projection 144A protrudes upward in a hemispherical shape. When the insulator 150 is not pressed, the insulator 150 does not contact the projection 144A, and there is a space between the projection 144A and the insulator 150. Upon the insulator 150 being pressed down, the insulator 150 contacts the projection 144A and presses the projection 144A down. In this state, the force is applied to the effort of the pressing member 140 that utilizes the principle of leverage.

The insulator 150 is made of a resin sheet, is bonded to the upper surface of the housing 110, and covers the opening 111. The insulator 150 includes a protrusion 151 at the center thereof in a plan view (see FIG. 1, FIG. 2, and FIG. 4). The protrusion 151 is formed by heating the resin sheet. According to the shape of the housing 110 in a plan view, the insulator 150 includes notches 155A, 155B corresponding to the recessed portions 115A, 115B.

The metal plates 120A and 120B, the metal contact 130A, the leaf spring 130B, and the pressing member 140 are housed in the compartment 112 of the housing 110, and the insulator 150 is bonded to the housing 110. By bonding the insulator 150 to the housing 110, the metal plates 120A and 120B, the metal contact 130A, the leaf spring 130B, and the pressing member 140 can be held in the compartment 112 without looseness.

The protrusion 151 is disposed at a position that overlaps with the effort portion 144 in a plan view, and is deflectable and deformable so as to contact the effort portion 144 (see FIG. 7). When the protrusion 151 is not deflected and deformed as illustrated in FIG. 6, the protrusion 151 is spaced apart from the effort portion 144.

Figure 8:
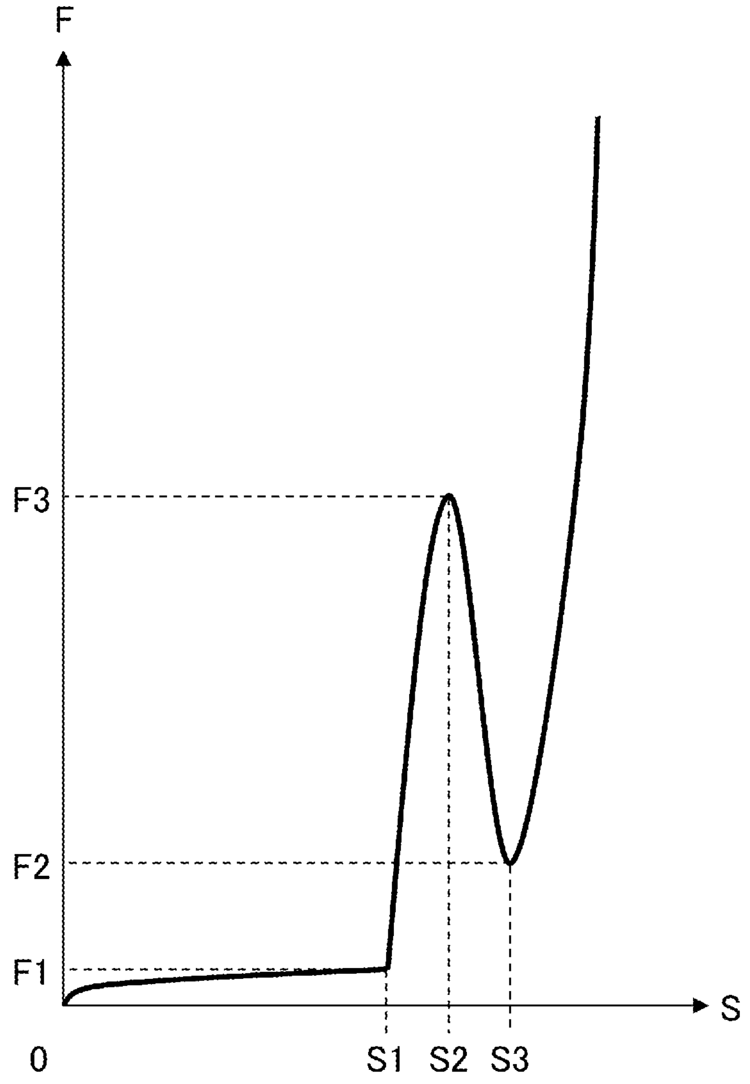
FIG. 8 is a graph indicating force-stroke (FS) characteristics of the push switch 100.

FIG. 8 is a graph indicating force-stroke (FS) characteristics of the push switch 100. The horizontal axis represents a stroke (S) for pressing the insulator 150 down, and the vertical axis represents a force (F) required to press the insulator 150 down. The force (F) corresponds to the operating load.

As illustrated in FIG. 8, when the insulator 150 is pressed down from a zero-stroke position, the operating load gradually increases until reaching S1. During this time, the operating load is very small. This indicates that the operating load required to press the protrusion 151 of the insulator 150 is very small.

S1 is 0.1 mm. The push switch 100 may include a button on the insulator 150. The button may be a push button switch used in a vehicle, a push-button switch used in an electronic device, or any button that is actually pressed.

For example, in the case of a product that is easily subjected to vibrations, such as a portable device, if there is a gap between an insulator 150 and a button, a vibration applied to the product would be transmitted to the button, and as a result, noise would be generated. In such a case, the noise may be reduced by pressing the button against another component while the product is not in operation. For example, the button may be attached to the insulator 150 while slightly pressing (pre-tensioning) the insulator 150 so as to avoid a gap between the button and the insulator 150. In this state, the insulator 150 is being pressed by the stroke S1 or less. In this case, when the button is pressed, the stroke may start from S1.

Upon the stroke reaching S1, the insulator 150 contacts the projection 144A of the effort portion 144. Upon the stroke exceeding S1, the pressing member 140 presses the metal contact 130A and the leaf spring 130B. Upon the stroke reaching S2, the operating load becomes F3 (a local maximum), and the metal contact 130A and the leaf spring 130B are inverted. At this time, the operating load starts to rapidly decrease, and thus a clicking sensation is provided to the user's finger. Pressing the insulator 150 further causes the stroke to reach S3 and the operating load to be decreased to F2. At this time, the metal contact 130A contacts the central fixed contact 121A, thereby causing the push switch 100 to be turned on.

As illustrated in FIG. 6 and FIG. 7, in the push switch 100, in order to utilize the principle of leverage, the distance between the fulcrum portion 142 and the load portion 143 may be set to 2 mm, and the distance between the load portion 143 and the effort portion 144 may be set to 1 mm, for example.

Therefore, a stroke for pressing the insulator 150 in order to turn the push switch 100 on is half a stroke for pressing and inverting the metal contact 130A and the leaf spring 130B alone. As used herein, pressing the metal contact 130A and the leaf spring 130B alone means pressing the metal contact 130A and the leaf spring 130B directly, without using the pressing member 140.

Further, an operating load required to press the insulator 150 in order to turn the push switch 100 on is twice an operating load required to press and invert the metal contact 130A and the leaf spring 130B alone.

Note that a stroke for pressing and inverting the metal contact 130A alone is 0.1 mm. This stroke is the same as the stroke for pressing and inverting the metal contact 130A and the leaf spring 130B that are stacked.

When the push switch 100 is in an OFF state, the metal contact 130A is not connected to the central fixed contact 121A, and remains insulated from the central fixed contact 121A. In this state, the distance between the central fixed contact 121A and the metal contact 130A is 0.1 mm. It is known that the metal contact 130A can remain insulated from the central fixed contact 121A when the distance between the central fixed contact 121A and the metal contact 130A is 0.1 mm. Upon the metal contact 130A and the leaf spring 130B being inverted and moved down by 0.1 mm, the metal contact 130A contacts the central fixed contact 121A.

As described above, the stroke for pressing the insulator 150 in order to turn the push switch 100 on is half the stroke for pressing and inverting the metal contact 130A and the leaf spring 130B alone. Therefore, the stroke for pressing the insulator 150 in order to turn the push switch 100 on is 0.05 mm.

That is, in the push switch 100 according to the first embodiment, the stroke required for the push switch 100 can be reduced by utilizing the principle of leverage, without reducing the stroke of the metal contact 130A and of the leaf spring 130B.

Conversely, if the principle of leverage is not utilized and the stroke for pressing and converting the metal contact 130A is set to 0.05 mm, the distance between the central fixed contact 121A and the metal contact 130A would be set to 0.05 mm when the push switch 100 is in an OFF state. With this configuration, the withstand voltage and insulation resistance would be reduced, thus making it difficult to maintain the insulation between the central fixed contact 121A and the metal contact 130A.

Further, if the stroke of the metal contact 130A is set to 0.05 mm, the insulator 150 would be difficult to be pretensioned.

In the first embodiment, the operating load required to press the insulator 150 in order to turn the push switch 100 on is twice the operating load required to press and invert the metal contact 130A and the leaf spring 130B alone. Accordingly, a clicking sensation during the operation of the push switch 100 can be made twice.

As described above, the extension portions 125A, 125B having such a shape that both ends in the Y direction of the terminals 122A, 122B extending in the Y direction are bent upward, are embedded in the corner portions 116A, 116B of the housing 110, and therefore, the rigidity of the housing 110 can be improved remarkably. In particular, the rigidity of the corner portions 116A, 116B of the housing 110 can be improved remarkably. Accordingly, the flexural rigidity of the push switch 100 that is bent in the longer-side direction can be remarkably improved.

Therefore, the push switch 200 with a higher rigidity can be provided.

Furthermore, because the extension portions 125A, 125B, having such a shape that both ends in the Y direction of the terminals 122A, 122B extending in the Y direction are bent upward, are embedded in the corner portions 116A, 116B of the housing 110, the length of the compartment 112 in the X direction can be secured. Therefore, in the pressing member 140, a large ratio of the length between the fulcrum portion 142 and the load portion 143 to the length between the fulcrum portion 142 and the effort portion 144 can be secured.

Furthermore, the terminals 122A, 122B are accommodated in the recessed spaces of the recessed portions 115A, 115B of the housing 110, so that the length of the push switch 100 in the X direction can be reduced, and the size of the push switch 100 in the longer-side direction can be reduced. Therefore, with the push switch 100 of a small size, the pressing member 140 that utilizes the principle of leverage can be effectively utilized.

Furthermore, according to the first embodiment, the push switch 100 achieving not only short-stroke but also electrical stability can be provided. In addition, a clicking sensation during operation can be increased, thus improving an operating sensation.

Furthermore, with the configuration in which the extension portions 125A, 125B are provided in the corner portions 116A, 116B of the housing 110, a large ratio of the length between the fulcrum portion 142 and the load portion 143 to the length between the fulcrum portion 142 and the effort portion 144 can be secured in the pressing member 140, so that a clicking sensation during operation can be increased, thus improving an operating sensation.

In addition, by utilizing the principle of leverage, the operating load required for the push switch 100 can be readily obtained if a metal contact 130A and a leaf spring 130B with low operating loads are used. In general, a metal contact 130A with a high operating load tends to have a longer operating life than a metal contact 130A with a low operating load. That is, the operating life of the push switch 100 can be extended.

Further, in the present embodiment, the leaf spring 130B is stacked on the metal contact 130A in order to obtain a predetermined operating load. However, if a required operating load is low, the number of stacked parts may be reduced (that is, the leaf spring 130B is not required to be provided).

Further, the pressing member 140 can be made by stamping a metal plate. Therefore, the components such as the fulcrum portion 142, the load portion 143, and the effort portion 144 can be readily formed.

In the above explanation, it is assumed that the push switch 100 includes the pressing member 140 that utilizes the principle of leverage, but the pressing member 140 may be configured not to utilize the principle of leverage. Specifically, instead of the pressing member 140, a pressing member that directly transmits the pressing load of the insulator 150 to the leaf spring 130B without utilizing the principle of leverage may be used.

In the above-described embodiment, the distance between the fulcrum portion 142 and the load portion 143 is set to 2 mm and the distance between the load portion 143 and the effort portion 144 is set to 1 mm. However, these distances can be adjusted, and the stroke and the pressing load of the insulator 150 can be freely set by adjusting these distances.

Further, in the above-described embodiment, the push switch 100 includes the metal contact 130A and the leaf spring 130B, but the push switch 100 may include the metal contact 130A only.

Further, in the above-described embodiment, the pressing member 140 includes the projection 143A and the projection 144A, but the pressing member 140 does not necessarily include one or both of the projection 143A and the projection 144A.

Second Embodiment

Figure 9:
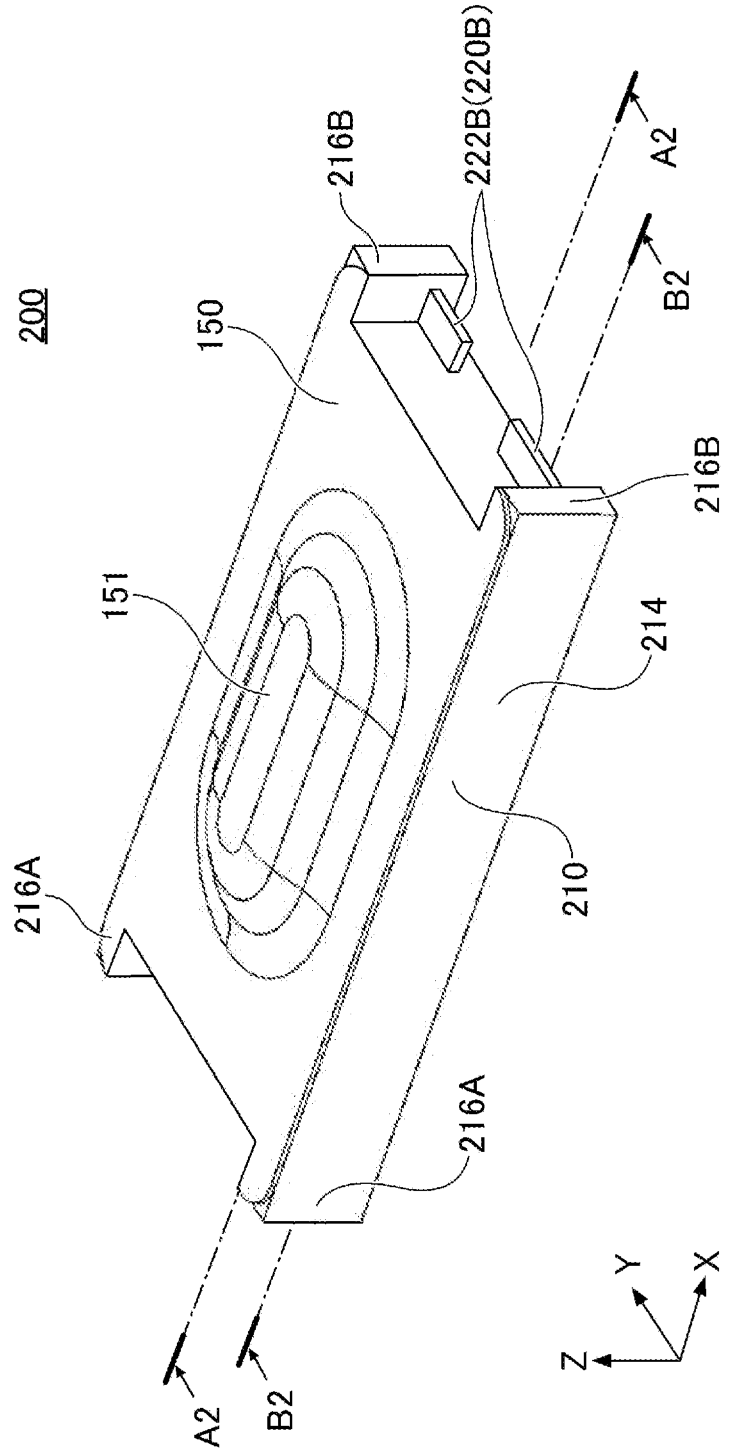
FIG. 9 is a perspective view of a push switch 200 according to a second embodiment.
Figure 10:
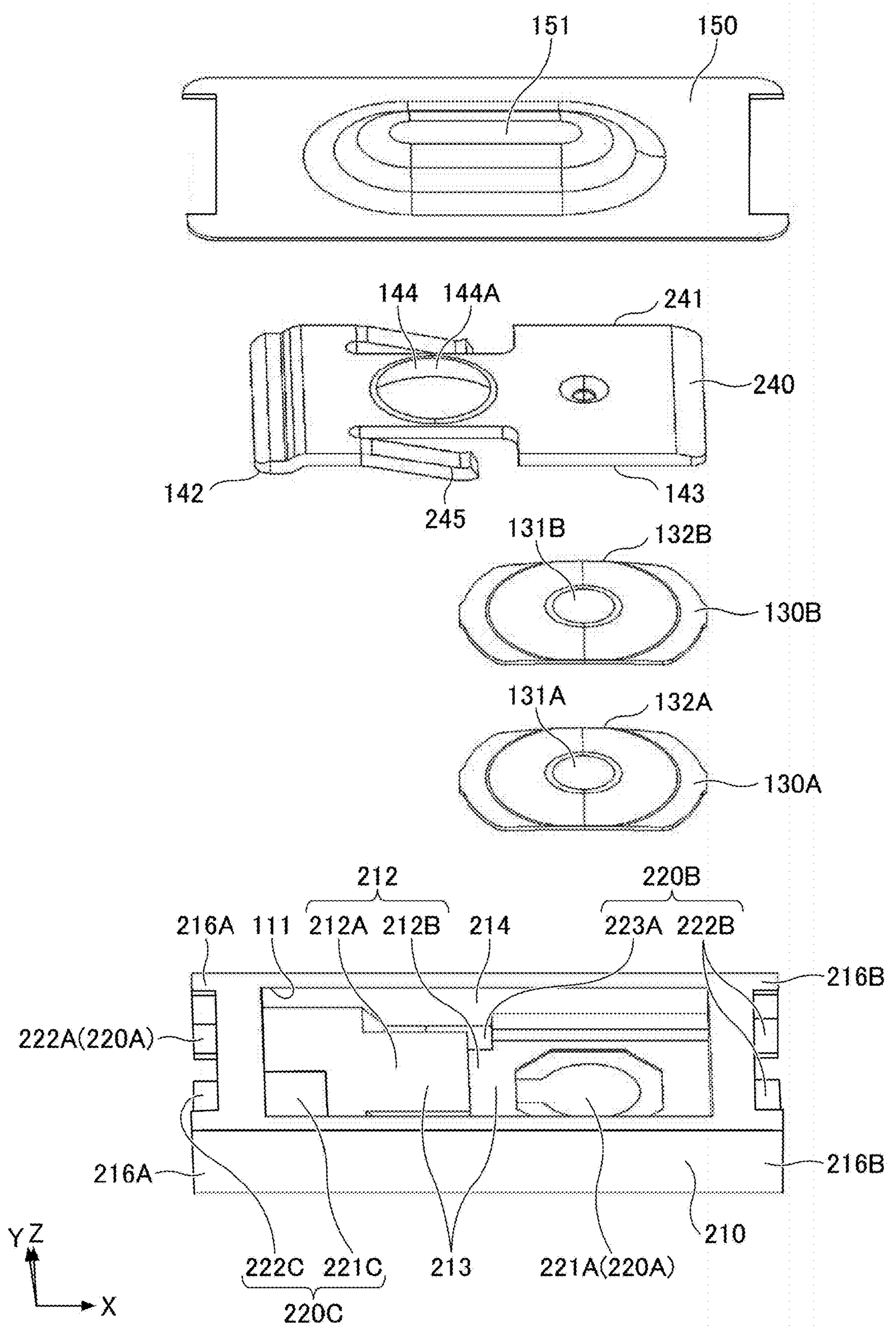
FIG. 10 is an exploded view of the push switch 200.

FIG. 9 is a perspective view of a push switch 200 according to a second embodiment. FIG. 10 is an exploded view of the push switch 200. In the second embodiment, the same XYZ coordinate system as in the first embodiment is used. The X direction is an example of a first axis direction, and the Y direction is an example of a second axis direction. −Y side is one side in the second axis direction, and +Y side is the other side in the second axis direction.

The push switch 200 includes a housing 210, metal plates 220A, 220B, and 220C, a metal contact 130A, a leaf spring 130B, a pressing member 240, and an insulator 150.

Figure 11:
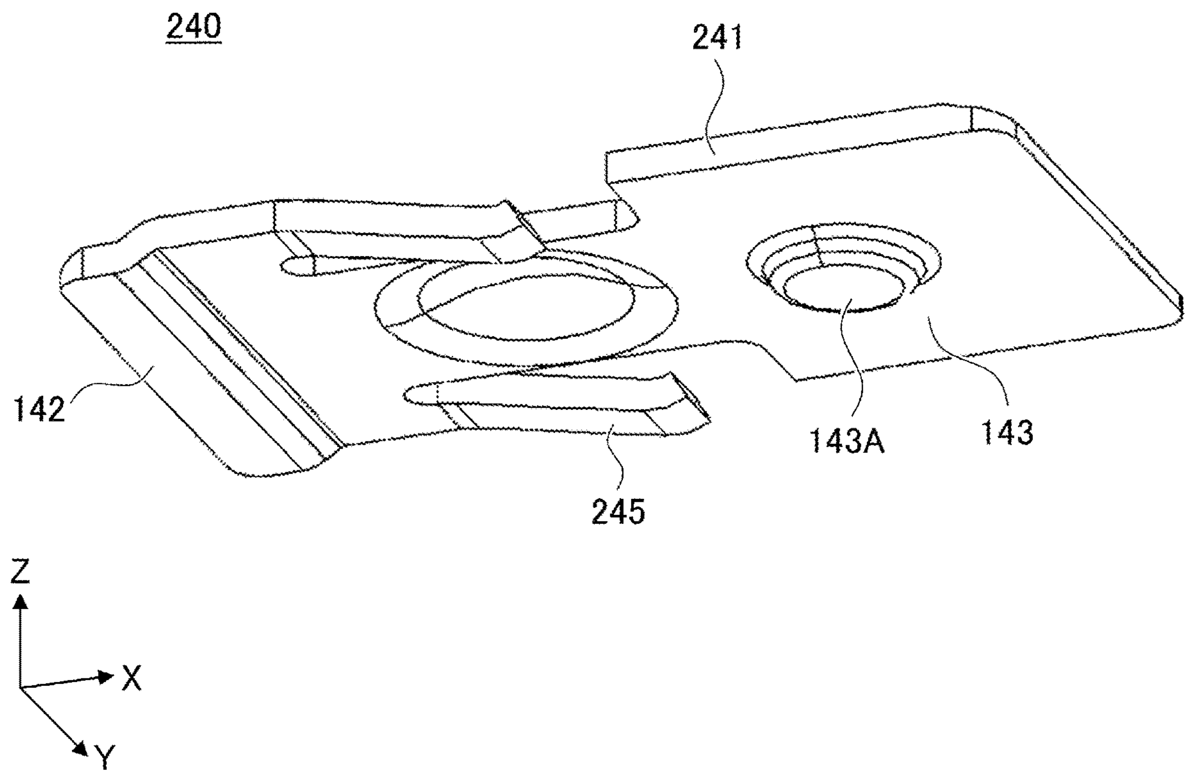
FIG. 11 is a drawing illustrating the back side of a pressing member 240.
Figure 12:
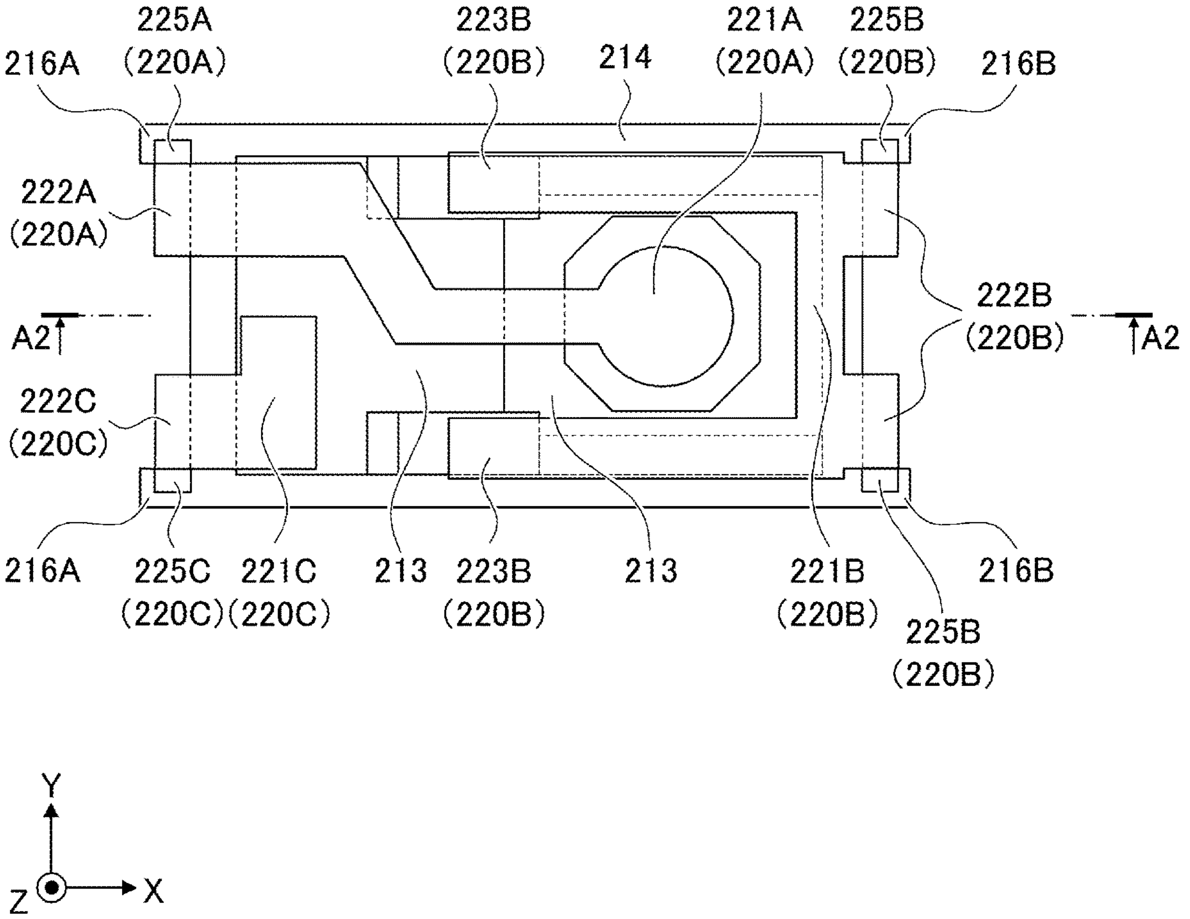
FIG. 12 is a drawing illustrating the structure of metal plates 220A, 220B, and 220C.
Figure 13A:
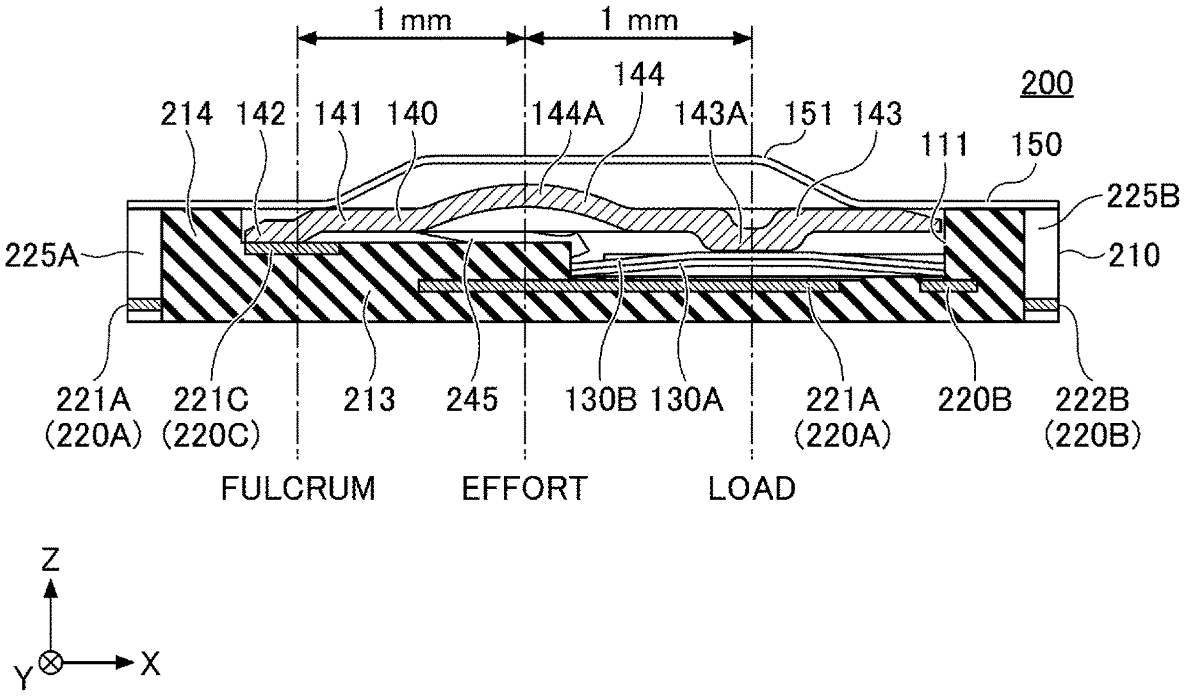
FIG. 13A is a cross-sectional view taken along A-A of FIG. 9.
Figure 13B:
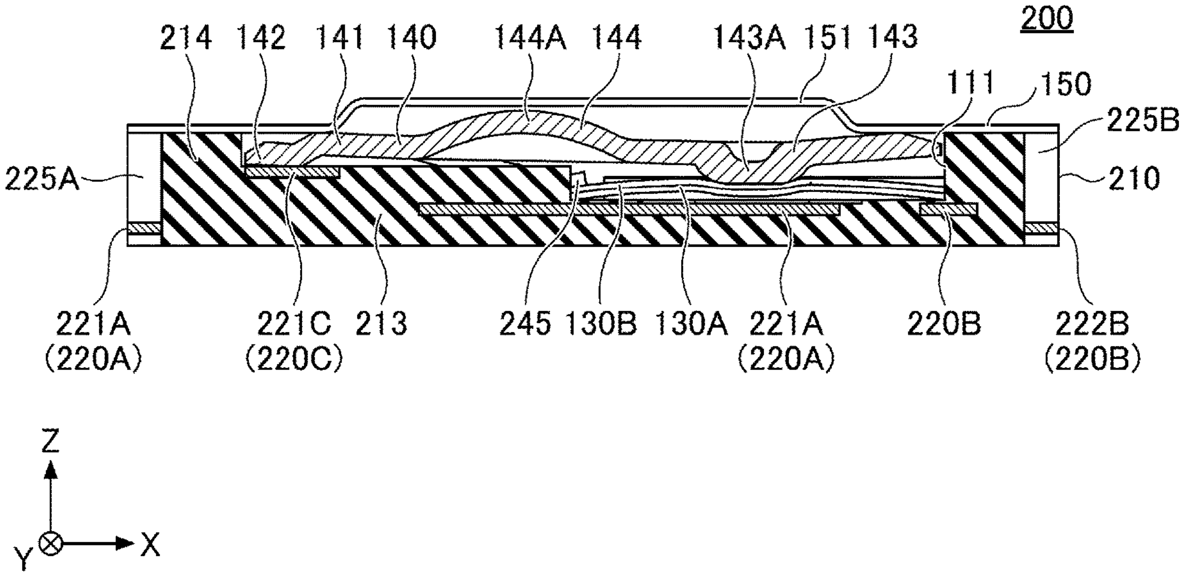
FIG. 13B is a cross-sectional view taken along A-A of FIG. 9.
Figure 13C:
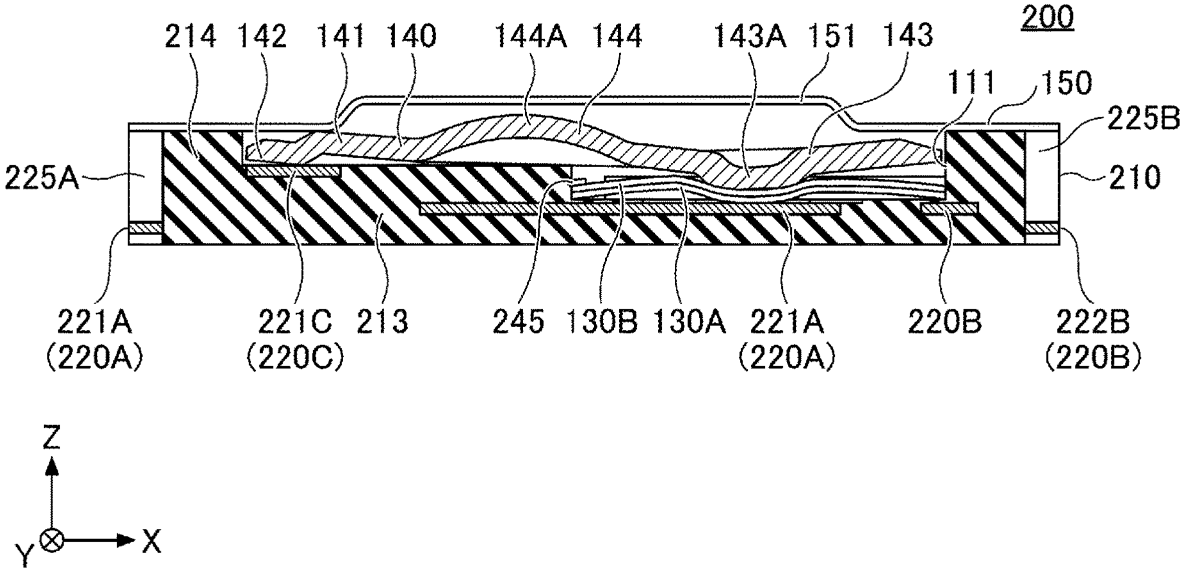
FIG. 13C is a cross-sectional view taken along A-A of FIG. 9.
Figure 14A:
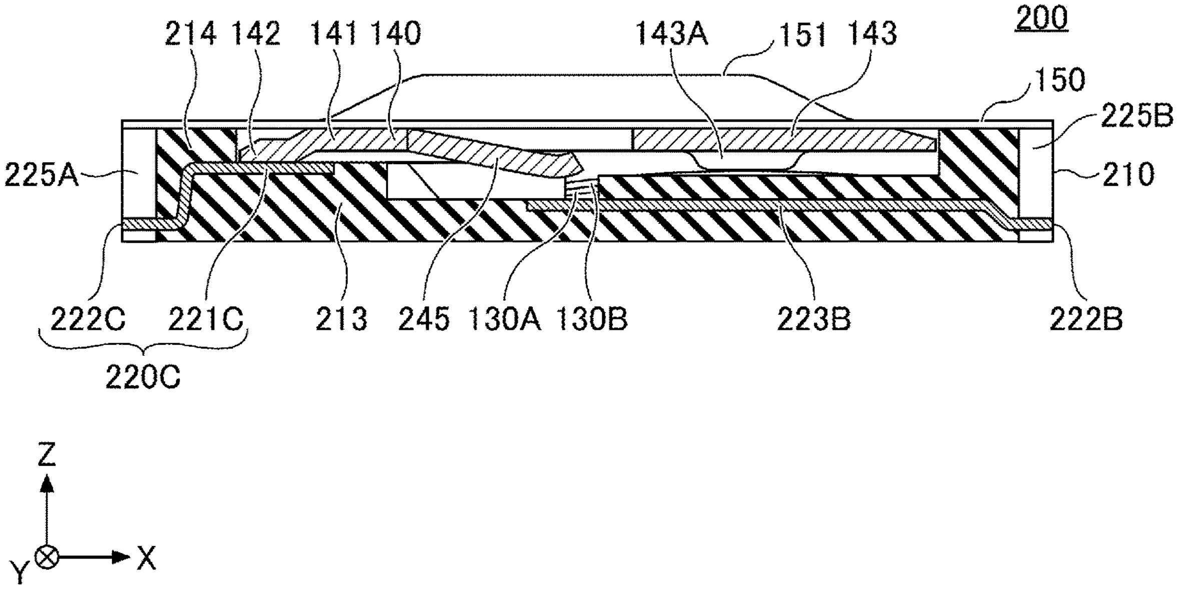
FIG. 14A is a cross-sectional view taken along B-B of FIG. 9.
Figure 14B:
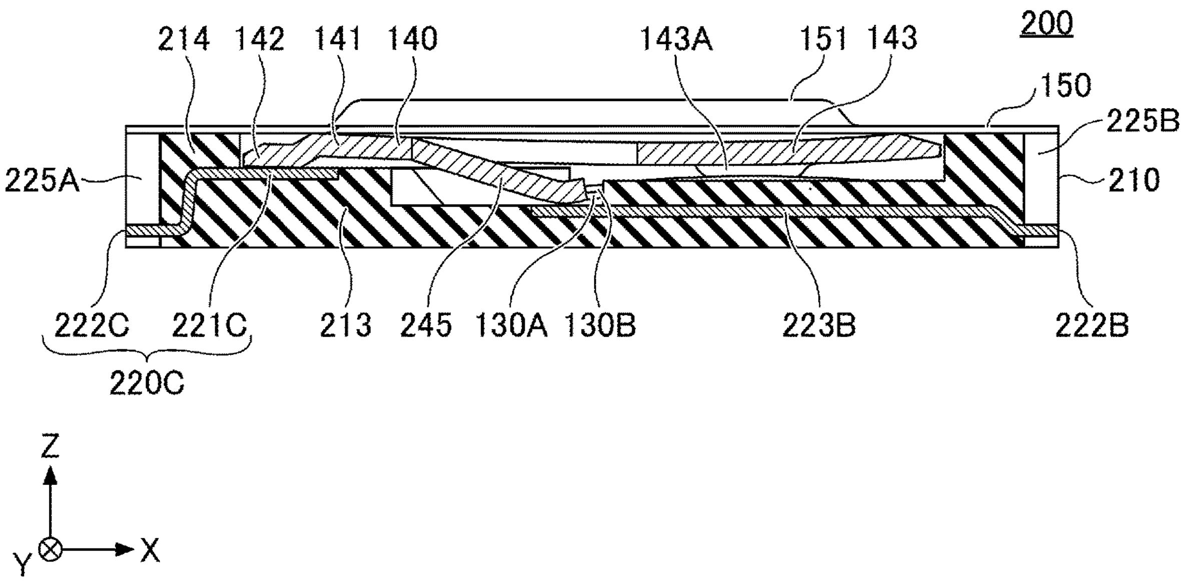
FIG. 14B is a cross-sectional view taken along B-B of FIG. 9.
Figure 14C:
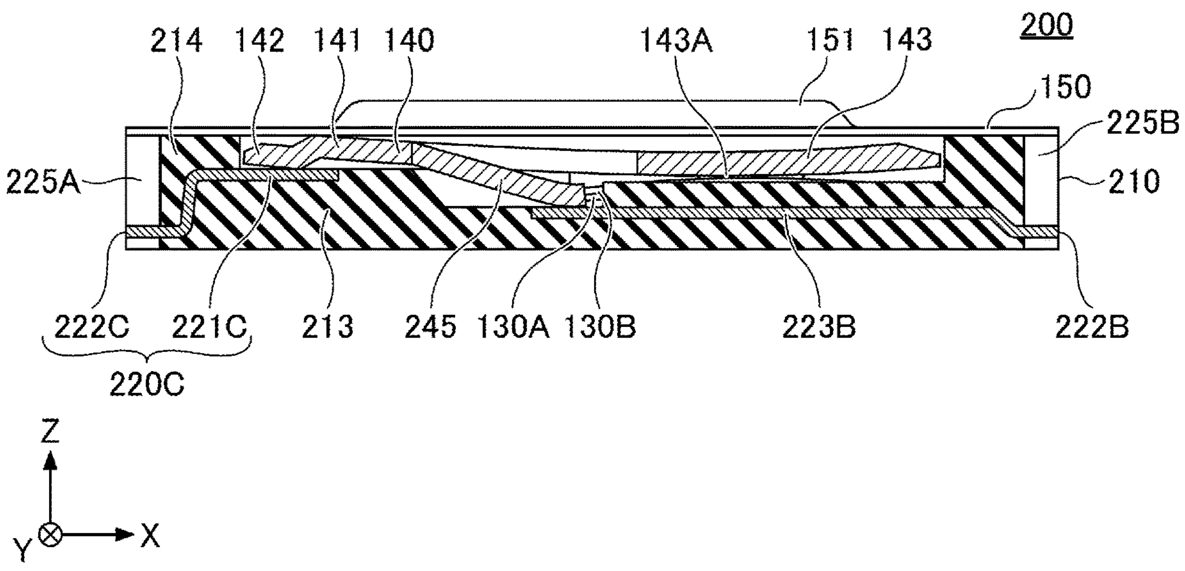
FIG. 14C is a cross-sectional view taken along B-B of FIG. 9.

In the following, the pressing member 240 will be described with reference to FIG. 10 and FIG. 11, and the metal plates 220A, 220B, and 220C will be described with reference to FIG. 10 and FIG. 12. FIG. 11 is a drawing illustrating the back side of the pressing member 240. FIG. 12 is a drawing illustrating the structure of the metal plates 220A, 220B, and 220C. FIG. 12 depicts the housing 210 transparently. Further, a cross-sectional structure will be described with reference to FIG. 13A through FIG. 13C and FIG. 14A through FIG. 14C. FIG. 13A through FIG. 13C are cross-sectional views of the push switch 200 taken through A2-A2 of FIG. 9. FIG. 14A through FIG. 14C are cross-sectional views of the push switch 200 taken through B2-B2 of FIG. 9. The cross-section taken along A2-A2 is a cross-section taken in a XZ plane at the center in the Y direction of the push switch 200. The cross-section taken along B2-B2 is a cross-section taken in a XZ plane at a position that is offset to −Y side with reference to the center in the Y direction of the push switch 200.

The push switch 200 according to the second embodiment includes the pressing member 240 having spring contact points 245 in place of the pressing member 140 of the push switch 100 according to the first embodiment, and includes metal plates 220A, 220B, and 220C in place of the metal plates 120A, 120B. The elements similar to those of the push switch 100 of the first embodiment are denoted by the same reference numerals, and a duplicate description thereof will be omitted.

The housing 210 is made of resin, and holds the metal plates 220A, 220B, and 220C. An end portion of the housing 210 in −X direction is an example of a first end portion in a first axis direction. An end portion of the housing 210 in +X direction is an example of a second end portion in the first axis direction.

The housing 210 and the metal plates 220A, 220B, and 220C are integrally formed by insert molding. In other words, the metal plates 220A, 220B, and 220C are embedded in the housing 210 by insert molding. The housing 210 includes an opening 111, a compartment 212 in communication with the opening 111, a bottom wall 213, a side wall 214, and recessed portions 215A, 215B. The opening 111 is formed on a surface on +Z side.

The bottom wall 213 is a plate-shaped portion provided on the bottom of the housing 210. The side wall 214 is a side wall extending upward from the four edges of the bottom wall 213. The space surrounded by the bottom wall 213 and the side wall 214 is the compartment 212. The bottom wall 213 has a step between the compartment 212A and the compartment 212B.

At the end portion on −X side of the housing 210, the recessed portion 215A is recessed in +X direction. At the end portion on +X side of the housing 210, the recessed portion 215B is recessed in −X direction. The recessed portions 215A, 215B are recessed in the X direction by the same length, and the recessed portions 215A, 215B have the same length in the Y direction. The position of the recessed portions 215A, 215B in the Y direction are the same.

In the following explanation, of the bottom wall 213 and the side wall 214 of the housing 210, portions situated at four corners in a plan view are referred to as corner portions 216A, 216B. The corner portions 216A are situated on both ends in the Y direction at the end of the housing 210 on −X side. Portions of the corner portions 216A on −X side protrude toward −X side with reference to the recessed portion 215A. The corner portions 216B are situated on both ends in the Y direction at the end of the housing 210 on +X side. Portions of the corner portions 216B on +X side protrude toward +X side with reference to the recessed portion 215B.

The compartment 212 extends downward from the opening, and includes a compartment 212A on −X side and a compartment 212B on +X side. The compartment 212B is deeper than the compartment 212A, and the bottom wall 213 has a step between the compartment 212A and the compartment 212B.

A central fixed contact 221A of the metal plate 220A, a peripheral fixed contact 221B of the metal plate 220B, and pre-sensing terminals 223B are provided on the bottom portion of the compartment 212B, and are exposed to the compartment 212B. In the compartment 212B, the metal contact 130A and the leaf spring 130B are provided in this order on the upper side of the central fixed contact 221A and the peripheral fixed contact 221B (see FIG. 13A), and the pressing member 240 is accommodated thereon so as to extend through the compartments 212A and 212B. The spring contact points 245 of the pressing member 240 are provided on the pre-sensing terminals 223B.

The bottom wall 213 is a portion at the bottom of the housing 210, and is a plate-shaped portion in a rectangular shape in a plan view. The bottom wall 213 holds the metal plates 220A, 220B, and 230C, and has a step between the compartment 212A and the compartment 212B. The bottom wall 213 is formed so that the upper surface of the central fixed contact 221A of the metal plate 220A, the upper surface of the peripheral fixed contact 221B of the metal plate 220B, and the upper surface of the pre-sensing terminal 223B are exposed in the compartment 212B.

The side wall 214 is provided along the four edges of the bottom wall 213, and extends upward from a portion of the bottom wall 213 that is outside the compartment 212. Extension portions 225A, 225B, and 225C of the metal plates 220A, 220B, and 220C are embedded in portions at four corners of the side wall 214 that are adjacent to the bottom wall 213.

The metal plate 220A includes the central fixed contact 221A, a terminal 222A, and an extension portion 225A (see FIG. 12). The terminal 222A is an example of a first terminal. As compared with the metal plate 120A according to the first embodiment, the metal plate 220A is different in a planar shape, because the metal plate 220C is additionally provided, but is substantially the same, in terms of function, as the metal plate 120A according to the first embodiment. The central fixed contact 221A, the terminal 222A, and the extension portion 225A correspond to the central fixed contact 121A, the terminal 122A, and the extension portion 125A, respectively, of the first embodiment.

The extension portion 225A is an example of a first extension portion, and is a portion extending obliquely upward that is obtained by bending upward the end portion on +Y side of the terminal 222A extending in +Y direction. In other words, the extension portion 225A is a portion extending obliquely upward that is obtained by bending upward a portion that is connected to the end portion of the terminal 222A on +Y side and that extends to +Y side. The extension portion 225A is embedded on the lower side, in a thickness direction, of the corner portion 216A of the housing 210 on +Y side. In the corner portion 216A on +Y side, the extension portion 225A extends between the bottom wall 213 and the side wall 214.

The metal plate 220B includes a peripheral fixed contact 221B, two terminals 222B, pre-sensing terminals 223B, and extension portions 225B (see FIG. 12). Of the two terminal 222B, the terminal 222B on +Y side is an example of a third terminal, and the terminal 222B on −Y side is an example of a fourth terminal. Of the two extension portions 225B, the extension portion 225B on +Y side is an example of a third extension portion, and the extension portion 225B on −Y side is an example of a fourth extension portion.

The metal plate 220B has such a configuration that the shape of the metal plate 120B according to the first embodiment is changed, two terminals 222B are provided, and two pre-sensing terminals 223B are added. Accordingly, in terms of function, the peripheral fixed contact 221B, the terminals 222B, and the extension portion 225B correspond to the peripheral fixed contact 121B, the terminal 122B, and the extension portion 125B of the first embodiment.

The two terminals 222B are provided to extend to +X side from the end portion on +Y side and the end portion on −Y side of the peripheral fixed contact 221B. The two pre-sensing terminals 223B extend toward −X side from the end portion on +Y side and the end portion on −Y side of the peripheral fixed contact 221B. Therefore, the metal plate 220B has an H-shape in a plan view.

Of the two extension portions 225B, the extension portion 225B on +Y side is a portion extending obliquely upward that is obtained by bending upward the end portion on +Y side of the terminal 222B. In other words, of the two extension portions 225B, the extension portion 225B on +Y side is a portion extending obliquely upward that is obtained by bending upward a portion that is connected to the end portion of the terminal 222A on +Y side and that extends to +Y side. The extension portion 225B on +Y side is embedded on the lower side, in a thickness direction, of the corner portion 216B of the housing 210 on +Y side. At the corner portion 216B on +Y side, the extension portion 225B on +Y side is provided to extend through the bottom wall 213 and the side wall 214.

Of the two extension portions 225B, the extension portions 225B on −Y side is a portion extending obliquely upward that is obtained by bending upward the end portion on −Y side of the terminal 222B. In other words, of the two extension portions 225B, the extension portion 225B on −Y side is a portion extending obliquely upward that is obtained by bending upward a portion that is connected to the end portion of the terminal 222A on −Y side and that extends to −Y side. The extension portion 225B on −Y side is embedded on the lower side, in a thickness direction, of the corner portion 216B of the housing 210 on −Y side. At the corner portion 216B on −Y side, the extension portion 225B on −Y side is provided to extend through the bottom wall 213 and the side wall 214.

The metal plate 220C includes a terminal 221C, a terminal 222C, and an extension portion 225C (see FIG. 12). The terminal 222C is an example of a second terminal. The metal plate 220C is made of, for example, copper. The terminal 221C is exposed on the bottom surface of the compartment 212A, and is in contact with the lower surface of the fulcrum portion 142 of the pressing member 240 in the compartment 212A. The terminal 222C protrudes from −X side of the housing 210. The terminal 221C is situated closer to +Z side than is the terminal 222C.

The extension portion 225C is an example of a second extension portion, and is a portion extending obliquely upward that is obtained by bending upward the end portion on −Y side of the terminal 222C. In other words, the extension portion 225C is a portion extending obliquely upward that is obtained by bending upward a portion that is connected to the end portion of the terminal 222C on −Y side and that extends to −Y side. The extension portion 225C is embedded on the lower side, in a thickness direction, of the corner portion 216A of the housing 210 on −Y side. At the corner portion 216A on −Y side, the extension portion 225C is provided to extend through the bottom wall 213 and the side wall 214.

The pressing member 240 is accommodated in the compartment 212 so as to extend through the compartments 212A and 212B (see FIG. 13A). The pressing member 240 is an example of a first pressing member, and includes a body portion 241, a fulcrum portion 142, a load portion 143, an effort portion 144, and spring contact points 245. The pressing member 240 can function as a lever. For example, the pressing member 240 may be made by processing a metal plate.

Similar to the body portion 141 of the pressing member 140 according to the first embodiment, the body portion 241 is provided with the spring contact points 245 on +Y side and −Y side of the central portion in the X axis direction. The body portion 241 has a shape in which the fulcrum portion 142 and the load portion 143 are curved upward with respect to the effort portion 144 such that the load portion 143 can be easily moved downward.

The spring contact points 245 extend in a direction on +X side and −Z side, i.e., extend obliquely downward, from +Y side and −Y side of the central portion, in the X axis direction, of the body portion 241. The spring contact points 245 can be moved in the Z axis direction, and achieves restoring force against displacement in the Z axis direction. The spring contact points 245 are examples of a first elastic piece.

In the push switch 200 as described above, similarly to the push switch 100 according to the first embodiment, the extension portions 225A, 225B, and 225C are provided to improve the rigidity of the entirety of the push switch 200 by reinforcing the corner portions 216A, 216B of the housing 210.

Even if the housing 210 receives stress from the upper side, the rigidity of the housing 210 can be remarkably improved due to the presence of the extension portions 225A, 225B, and 225C that are made of metal. In particular, the rigidity of the corner portions 216A, 216B of the housing 210 can be remarkably improved. Accordingly, the flexural rigidity of the push switch 200 that is bent in the longer-side direction can be remarkably improved.

In the push switch 200, the extension portions 225A, 225B, and 225C are embedded in the corner portions 216A, 216B of the housing 210, and accordingly, the extension portions 225A, 225B, and 225C are situated inside the bottom wall 213 and the side wall 214 in the corner portions 216A, 216B. Specifically, even when the extension portions 225A, 225B, and 225C are provided, the extension portions 225A, 225B, and 225C do not affect the size of the compartment 212.

In a case where the pressing member 240 that utilizes the principle of leverage is included, an increase in the length in the X direction of the compartment 212 results in a larger ratio of the length between the fulcrum and the load to the length between the fulcrum and the effort in accordance with the principle of leverage. From this standpoint, it is effective to provide the extension portions 225A, 225B, and 225C in the corner portions 216A, 216B of the housing 210.

Furthermore, the terminals 222A, 222B, and 222C are accommodated in the recessed spaces of the recessed portions 215A, 215B of the housing 210, and therefore, the length of the push switch 200 in the X direction can be reduced.

Hereinafter, it is assumed that, in the corner portions 216A, 216B of the housing 210, each of the extension portions 225A, 225B, and 225C is provided to extend through the bottom wall 213 and the side wall 214. However, in the corner portions 216A, 216B, the extension portions 225A, 225B, and 225C may be provided in any one of the bottom wall 213 and the side wall 214. For example, in a case where the bottom wall 213 is relatively thick, the extension portions 225A, 225B, and 225C may be provided only in the bottom wall 213. For example, in a case where the bottom wall 213 is relatively thin, the extension portions 225A, 225B, and 225C may be provided only in the side wall 214 in the corner portions 216A, 216B. Specifically, in the corner portions 216A, 216B, the extension portions 225A, 225B, and 225C may be provided in the bottom wall 213 or the side wall 214, or may be provided in both the bottom wall 213 and the side wall 214.

Hereinafter, an operation of the push switch 200 is explained with reference to FIG. 13A through FIG. 13C and FIG. 14A through FIG. 14C. FIG. 13A and FIG. 14A illustrate a case where the insulator 150 is not pressed and the push switch 200 is in the OFF state.

In FIG. 13B and FIG. 14B, the insulator 150 is slightly pushed to cause the ends of the spring contact points 245 to be connected to the pre-sensing terminal 223B of the metal plate 220B but the metal contact 130A and the leaf spring 130B are not inverted, so that the metal contact 130A is not in contact with the central fixed contact 221A of the metal plate 220A.

The fulcrum portion 142 of the pressing member 240 is in contact with the terminal 221C of the metal plate 220C, and accordingly, in this state, the pre-sensing terminal 223B of the metal plate 220B and the terminal 221C of the metal plate 220C are connected by the pressing member 240. Specifically, the terminal 222B and the terminal 222C are in a conductive state.

As described above, before the metal contact 130A comes into contact with the central fixed contact 221A of the metal plate 220A, the ends of the spring contact points 245 are connected to the pre-sensing terminal 223B of the metal plate 220B, so that a state in which the insulator 150 is slightly pushed but the metal contact 130A is not in contact with the central fixed contact 221A can be detected.

According to this configuration, an electronic device connected to the terminals 222A, 222B, and 222C of the push switch 200 can detect (pre-sense) a state in which the insulator 150 is slightly pressed to cause the terminal 222B and the terminal 222C to be in a conductive state but the terminal 222A and the terminal 222C are not connected (a state before the metal contact 130A comes into contact with the central fixed contact 221A).

In FIG. 13C and FIG. 14C, the insulator 150 is furthermore pressed to invert the metal contact 130A and the leaf spring 130B, and the metal contact 130A is in contact with the central fixed contact 221A of the metal plate 220A. In this state, the ends of the spring contact points 245 are kept in a state of being connected to the pre-sensing terminal 223B of the metal plate 220B. In this state, the terminal 222A and the terminal 222C are in a conductive state.

Therefore, as illustrated in FIG. 13B and FIG. 14B, the push switch 200 can achieve two states, i.e., a state in which the insulator 150 is slightly pressed to cause the terminal 222B and the terminal 222C to be in a conductive state and a state in which the insulator 150 is furthermore pressed to cause the terminal 222A and the terminal 222C to be in a conductive state.

Figure 15:
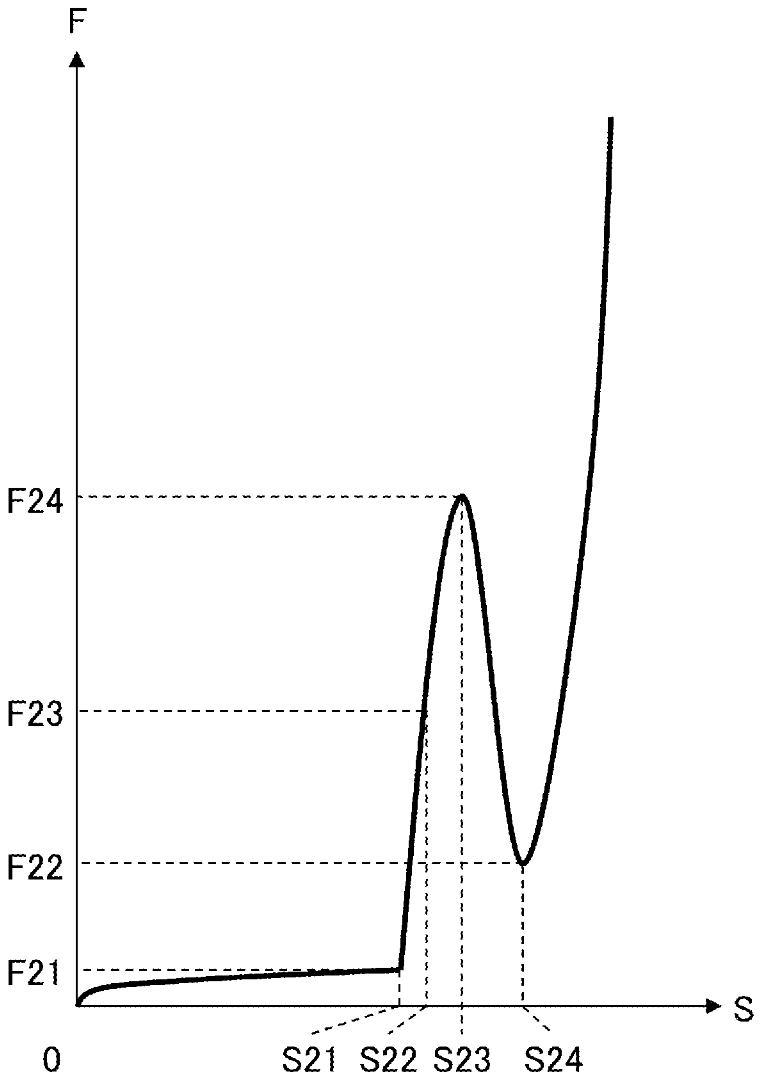
FIG. 15 is a graph indicating force-stroke (FS) characteristics of the push switch 200.

FIG. 15 is a graph indicating force-stroke (FS) characteristics of the push switch 200. A section from a zero-stroke position to S21 in FIG. 15 is the same as the section from the zero-stroke position to S1 of the push switch 100 according to the first embodiment (see FIG. 8). That is, S21 is equal to the stroke S1, and operating load F21 is equal to F1.

Upon the stroke reaching S22 after passing S21, the spring contact points 245 come into contact with the pre-sensing terminals 223B, and the terminals 222B are electrically connected to the terminal 222C. F23 indicates the operating load at this time.

Upon the insulator 150 being further pressed, the pressing member 240 presses the metal contact 130A and the leaf spring 130B. Upon the stroke reaching S23, the operating load becomes F24 (a local maximum) and the metal contact 130A and the leaf spring 130B are inverted. At this time, the operating load starts to rapidly decrease, and thus a clicking sensation is provided to the user's finger. Pressing the insulator 150 further causes the stroke to reach S24 and the operating load to be decreased to F22. At this time, the metal contact 130A comes into contact with the central fixed contact 221A, thereby causing the push switch 100 to be turned on.

Note that the stroke S22 can be adjusted by adjusting the amount of displacement of the spring contact points 245, and the operating load F23 can be adjusted by adjusting the elastic force of the spring contact points 245.

As described above, the extension portions 225A, 225B, and 225C provided on the terminals 222A, 122B, and 222C are embedded in the corner portions 216A, 216B of the housing 210, and therefore, the rigidity of the housing 210 can be improved remarkably. In particular, the rigidity of the corner portions 216A, 216B of the housing 210 can be improved remarkably. Accordingly, the bending rigidity of the push switch 200 that is twisted in the longer-side direction can be remarkably improved.

Therefore, the push switch 200 with a high degree of rigidity can be provided.

Furthermore, in the second embodiment, similar to the first embodiment, the push switch 200 achieving not only short-stroke but also electrical stability can be provided. Furthermore, a clicking sensation during operation can be increased, thus improving an operating sensation.

Further, with the spring contact points 245, the push switch 200 that can be brought into the above-described two states can be provided. In addition to the above-described effects, the push switch 200 according to the second embodiment can exhibit any effects similar to those of the push switch 100 of the first embodiment. In addition, variations similar to those of the push switch 100 of the first embodiment can be made to the push switch 200 according to the second embodiment.

In the above explanation, it is assumed that the push switch 200 includes the pressing member 240 that utilizes the principle of leverage, but the pressing member 240 may be configured not to utilize the principle of leverage. Specifically, instead of the pressing member 240, a pressing member that directly transmits the pressing load of the insulator 150 to the leaf spring 130B without utilizing the principle of leverage may be used.

Also, at least one spring contact point 245 may be provided, and three or more spring contact points 245 may be provided.

According to the above-described embodiments, the push switch with a high degree of rigidity can be provided.

Although the push switches according to the embodiments have been described above, the present invention is not limited to the particulars of the above-described embodiments. Variations and modifications may be made without departing from the scope of the subject matter recited in the claims.

What is claimed is:

1. A push switch comprising:

a housing including a bottom wall and a side wall, the housing extending in a first axis direction and a second axis direction in a plan view; and a fixed contact member configured to come into contact with a movable contact member, the fixed contact member being embedded in the bottom wall of the housing by insert molding, wherein the fixed contact member includes:

a first terminal exposed to an outside from a first end portion in the first axis direction of the housing; and first extension portions, constituting a pair, that are both ends of the first terminal in the second axis direction, the first extension portions being bent upward and being embedded in the bottom wall or the side wall of the housing, or in both the bottom wall and the side wall of the housing, by the insert molding.

2. The push switch according to claim 1, wherein the first extension portions, constituting the pair, are embedded in the bottom wall or the side wall of the housing, or in both the bottom wall and the side wall of the housing, by the insert molding, at corner portions on both sides, in the second axis direction, of the first end portion of the housing.

3. The push switch according to claim 2, wherein the housing has a first recessed portion that is recessed in the first axis direction between the corner portions on the both sides, in the second axis direction, of the first end portion of the housing, and the first terminal is exposed to the outside from the first recessed portion of the first end portion.

4. The push switch according to claim 1, wherein the fixed contact member further includes:

a second terminal exposed to the outside from a second end portion in the first axis direction of the housing; and second extension portions, constituting a pair, that are both ends of the second terminal in the second axis direction, the second extension portions being bent upward and being embedded in the bottom wall or the side wall of the housing, or in both the bottom wall and the side wall of the housing, by insert molding.

5. The push switch according to claim 4, wherein the second extension portions, constituting the pair, are embedded in the bottom wall or the side wall of the housing, or in both the bottom wall and the side wall of the housing, by insert molding, at corner portions on both sides, in the second axis direction, of the second end portion of the housing.

6. The push switch according to claim 5, wherein the housing has a second recessed portion that is recessed in the first axis direction between the corner portions on the both sides, in the second axis direction, of the second end portion of the housing, and the second terminal is exposed to the outside from the second recessed portion of the second end portion.

7. The push switch according to claim 1, wherein the first axis direction is a longer-side direction, and the second axis direction is a shorter-side direction.

8. The push switch according to claim 1, further comprising:

the movable contact member provided in a compartment surrounded by the bottom wall and the side wall of the housing; and a pressing member provided in the compartment and configured to press the movable contact member toward the bottom wall.

9. The push switch according to claim 8, wherein an opening that is open above the side wall is formed in the housing, the movable contact member is disposed closer to the opening than the fixed contact member within the compartment, and the movable contact member includes a dome protruding toward the opening and being invertible, the pressing member is disposed closer to the opening than the movable contact member within the compartment and includes a first fulcrum portion, a first load portion, and a first effort portion, the first fulcrum portion being disposed on one side of the pressing member to be in contact with the housing, the first load portion being disposed on another side of the pressing member to press the movable contact member, and the first effort portion being disposed between the first fulcrum portion and the first load portion, and upon the first effort portion being pressed through the opening, a first protrusion of the first load portion presses and inverts the dome of the movable contact member, and the movable contact member comes into contact with the fixed contact member.

* * * * *